United States Patent [19]

Krasznai et al.

[11] 4,456,820
[45] Jun. 26, 1984

[54] ROTARY CAM AND SENSOR TEMPERATURE CONTROL FOR V-1000 TOASTER OVEN

[75] Inventors: Charles Z. Krasznai, Trumbull; Paul V. Snyder, Oxford, both of Conn.

[73] Assignee: General Electric Company, New York, N.Y.

[21] Appl. No.: 490,407

[22] Filed: May 2, 1983

[51] Int. Cl.³ .................. F27D 11/02; A21B 1/40
[52] U.S. Cl. ............................. 219/398; 99/333; 337/361; 219/413
[58] Field of Search ............... 219/398, 391, 395, 412, 219/413, 414, 408, 405; 99/331, 333; 337/361, 305

[56] References Cited

U.S. PATENT DOCUMENTS

| | | | |
|---|---|---|---|
| 2,442,900 | 6/1948 | McCormick | 219/395 |
| 2,920,551 | 1/1960 | Schmall | 99/329 |
| 2,935,591 | 5/1960 | Lee | 219/413 |
| 3,032,636 | 5/1962 | Schauer | 219/413 |
| 3,119,000 | 1/1964 | Loch et al. | 219/19 |
| 3,190,989 | 6/1965 | Komatsu | 99/333 |
| 3,201,565 | 8/1965 | Clapp | 219/398 |
| 3,684,861 | 8/1972 | DeRemer | 219/413 |
| 3,752,955 | 8/1973 | Grove | 219/413 |
| 4,065,658 | 12/1977 | Keim | 219/386 |
| 4,111,358 | 9/1978 | Semple | 219/398 |
| 4,178,498 | 11/1979 | Snyder | 219/413 |
| 4,188,867 | 2/1980 | DeRemer | 99/385 |
| 4,189,632 | 2/1980 | Swanson et al. | 219/413 |
| 4,302,660 | 11/1981 | Swanson et al. | 219/391 |

*Primary Examiner*—Roy N. Envall, Jr.
*Assistant Examiner*—Teresa J. Walberg
*Attorney, Agent, or Firm*—Leonard J. Platt; George R. Powers; John F. Cullen

[57] ABSTRACT

An electric oven toaster construction wherein a unique rotatable cam controls the bake, toasting and broiling modes of the oven toaster and simultaneously sets the threshold temperature of a thermostat switch during toasting, baking and broiling. The rotary cam includes a rearwardly extending rod portion having a radially outwardly extending lobe for cooperating with a cam follower portion of a bake switch for opening the bake switch when a bake operation is set and closing the bake switch when a toast operation is set. The rotatable cam also includes a circular disc portion positioned in front of the rod portion and integrally formed therewith. The circular disc portion has a cam surface that extends rearwardly and is in sliding engagement with a thermostat cam follower blade to set the thermostat cam follower for a particular toast color. Thus, with the unique integrally formed cam, when the cam is simply rotated to the toast position, the cam simultaneously closes the bake switch so that a solenoid will be energized to open the main switch when the toast cycle is complete and the cam also sets the thermostat cam follower to select a particular toast color.

5 Claims, 11 Drawing Figures

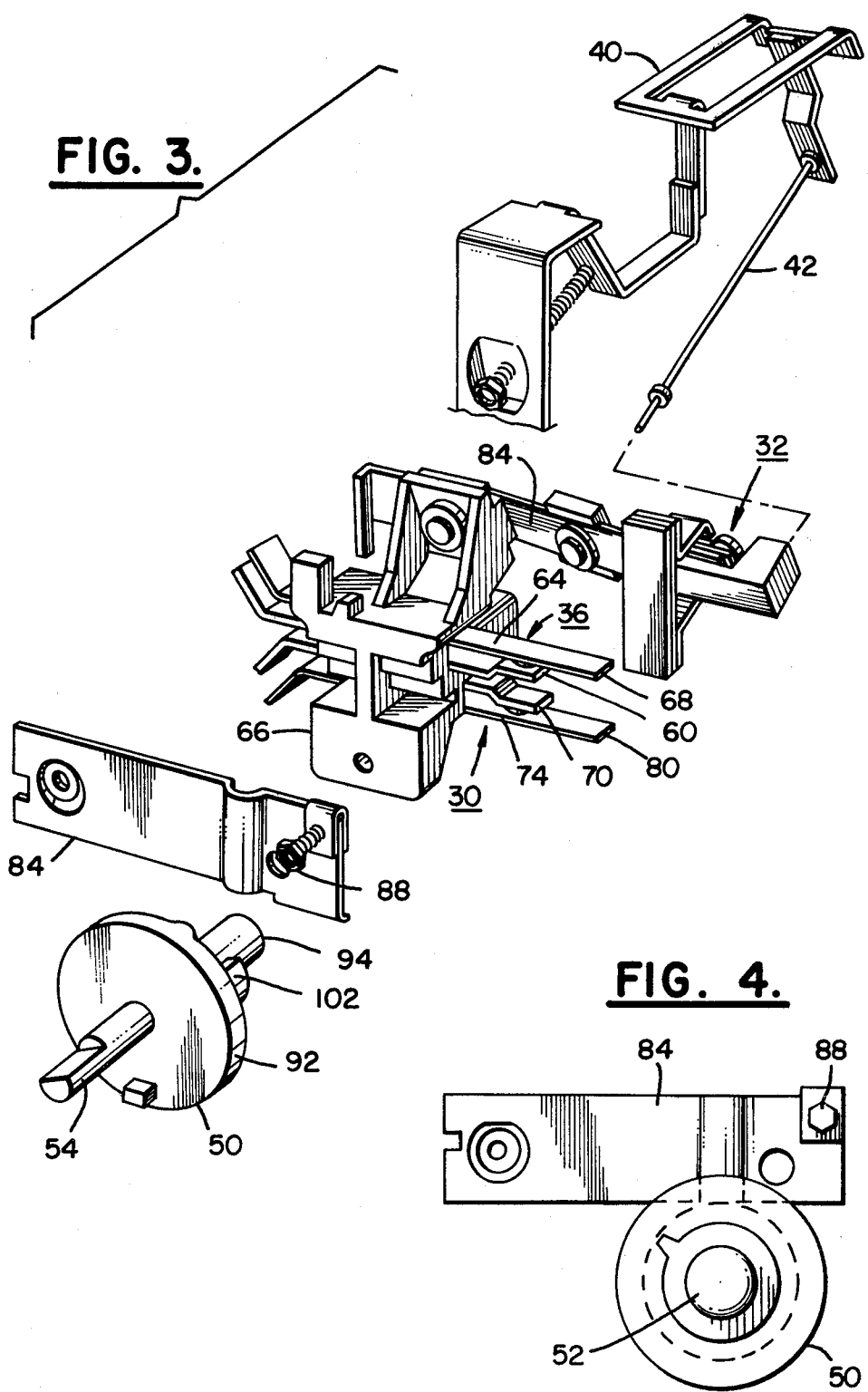

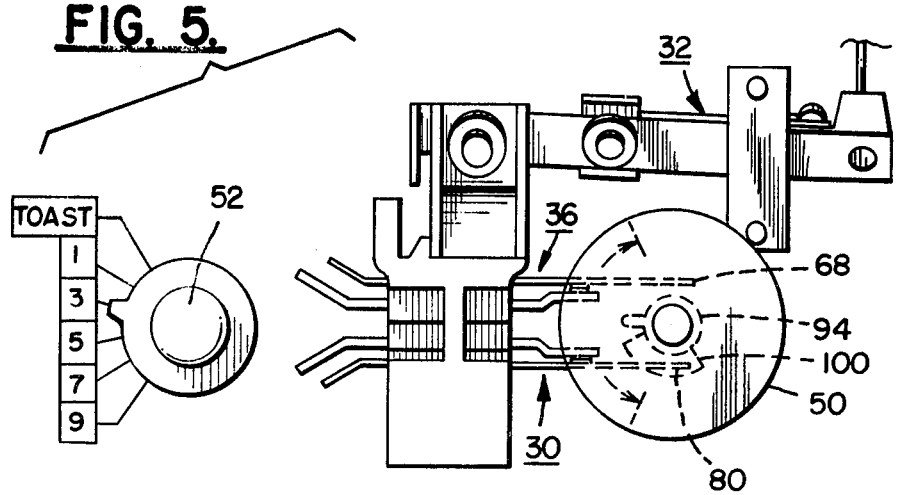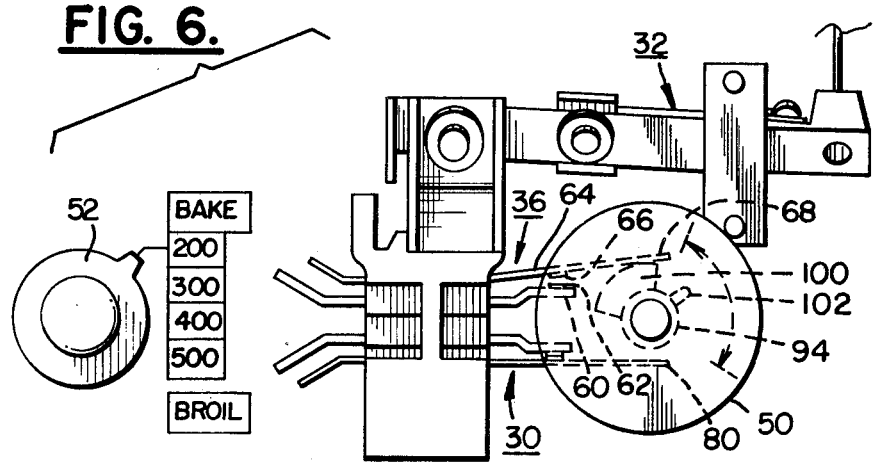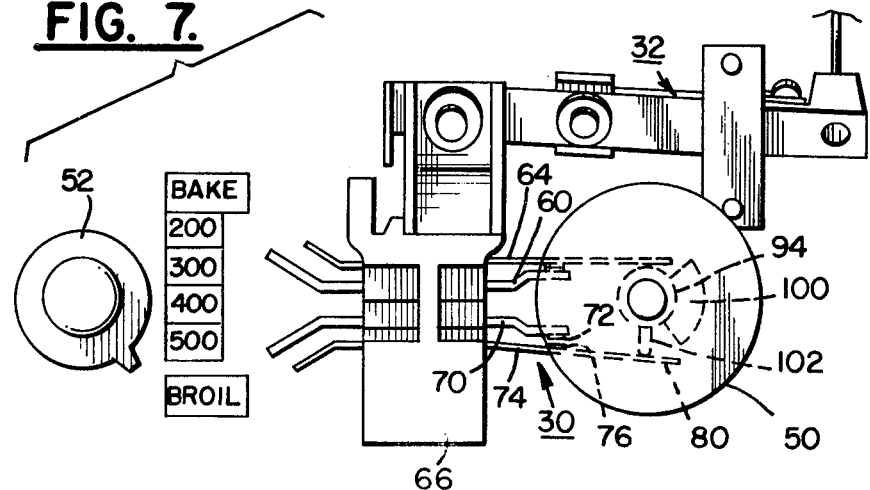

ROTARY CAM AND SENSOR TEMPERATURE CONTROL FOR V-1000 TOASTER OVEN

BACKGROUND OF THE INVENTION

1. Field of the Invention.

This invention relates to an electric toaster oven broiler and, more particularly, to a simplified rotatable cam control mechanism for such an oven toaster broiler.

2. Description of the Prior Art.

In a prior U.S. Pat. No. 3,752,955 to Lawrence L. Grove, assigned to the same assignee as the present invention, there is disclosed an arrangement for controlling operation of an oven toaster. The controls are arranged along the lower front of the oven toaster and a slide cam is provided for setting the desired toast color. A heat responsive control member 158 is positioned within the cooking chamber for sensing the temperature of the food being cooked so that a main switch 44 may be opened at the end of a cooking cycle. The controls include a rod 170, which is moved far enough at the end of the cooking cycle by the bi-metal 158 to open a switch 162, 164 to energize a solenoid 120 to thereby open the main switch at the end of a toasting period.

In a prior U.S. Pat. No. 3,684,861 to Harold A. Deremer, assigned to the same assignee as the present invention, there is disclosed a different arrangement for controlling the operation of an oven toaster which includes a heat-up/cool-down bi-metal timer for controlling the duration of a toast cycle. A rotatable cam 62 is provided for selecting the toast color desired.

Our invention is concerned with such oven toaster control mechanisms and, more particularly, to an improved, simplified control mechanism, wherein a single, integrally formed, manually rotatable cam is provided for selecting bake, broil, and toast modes and opening or closing the switches that are required for the particular mode selected and, simultaneously, adjusting the relative position of a thermostat cam follower for selecting the threshold temperature at which the thermostat will terminate the cooking cycles or the toasting cycle to turn the heating elements off as required by the particular bake, broil, or toast operation that has been selected.

SUMMARY OF THE INVENTION

Accordingly, it is a particular object of our invention to provide an improved simplified control mechanism for an electric oven toaster broiler having relatively few parts which may be readily manufactured and assembled to each other.

An electric oven toaster which may be operated by our improved, simplified control mechanism may include upper and lower heating elements, and a thermostat switch which may be set to open when a particular preset temperature has been reached. Conventionally, it will also include a main switch for energizing and deenergizing the oven toaster, including both its upper and lower heating elements. It may also include a solenoid, which is operated upon opening of the thermostat switch to open the main switch to deenergize both the upper and lower heating elements. It may include a bake switch, which is movable to an open position during a baking operation to prevent energization of the solenoid and the opening of the main switch when the threshold temperature that has been set by the thermostat has been reached to, thereby, permit the thermostat switch to cycle ON and OFF during the baking operation to maintain a particular bake temperature. The bake switch is moved to a closed position during the toasting operation to permit the solenoid to open the main switch when the particular temperature set by the thermostat switch is reached during the toasting operation and the thermostat switch is opened.

In accordance with one of the aspects of this invention, our unique, manually operable, rotatable cam for opening and closing the bake switch and for setting the threshold temperature of the thermostat during bake and toasting operations is uniquely positioned within the toaster oven adjacent to cam follower portions of the bake switch, broil switch and thermostat switch for setting and controlling the operation of these switches. The bake switch includes a movable switch blade with a cam follower portion that is positioned for actuation by the rotatable cam and the thermostat switch includes a movable switch blade with cam follower portion that is engageable with a unique rotatable cam for setting the threshold temperature at which the thermostat switch may be opened to terminate the toast cycle or to cycle the thermostat switch ON or OFF for maintaining a particular bake temperature. The unique rotatable cam includes a rearwardly extending rod portion, having a radially outwardly extending lobe for cooperating with the cam follower portion of the bake switch for opening the bake switch when a bake operation is set and for closing the bake switch when a toast operation is set. The rotatable cam also uniquely includes a circular disc portion, integrally formed with the rod portion. The circular disc portion has a cam surface that extends rearwardly and is in sliding engagement with the thermostat cam follower portion so that the rotary position of the rotatable cam may be manually adjusted to set the disc portion of the cam to set the thermostat cam follower for a particular toast color. With this unique arrangement, the rotatable cam may simply be rotated to a particular toast color position to adjust the disc portion of the cam with respect to the thermostat switch cam follower and, simultaneously, the lobe on the rod portion of the cam will be moved away from the bake switch cam follower to close the bake switch when a toast operation is set.

In accordance with one of the other aspects of this inventions, our unique, simplified rotatable cam may also include a second radially, outwardly extending lobe on the rod portion of the cam; the second radially, outwardly extending lobe may be spaced rearwardly and clockwise from the bake switch lobe. The second lobe on the rod portion of the cam may be positioned adjacent to a cam follower of a broil switch for opening the broil switch and closing the bake switch, when a broil operation is set, by adjusting the relative rotational position of the cam. The disc portion of the cam includes a raised, rearwardly extending surface that is in slidable engagement with the thermostat switch cam follower for setting a very high threshold temperature for the thermostat switch when the unique rotatable cam has been set in the broil operation with the broil lobe on the rod portion of the cam in a position to hold the broil switch open to prevent the energization of the lower heating elements.

Accordingly, with our improved construction relatively few parts are required for controlling the operation of an oven toaster. A single, manually rotatable cam is positioned between cam follower blades of a bake switch, a broil switch, and a thermostat switch for simultaneously opening and closing the appropriate switches and selecting the particular threshold temperature for bake, broil, or toast operations. Thus, an exceedingly simple, reliable oven toaster broiler control has been achieved.

BRIEF DESCRIPTION OF THE DRAWING

Other objects and attendant advantages of the invention will be apparent from the following description taken in connection with the accompanying drawing in which:

FIG. 3 is a fragmentary exploded perspective view showing our improved, simplified control mechanism;

FIG. 4 is a fragmentary front elevational view of our improved control mechanism showing the rotatable disc cam portion of the cam in engagement with the thermostat switch blade cam follower;

FIG. 5 is a diagrammatic front view of our improved control mechanism with the rotatable cam in a toast position wherein the bake and broil switches are closed and the disc portion of the cam has selected a particular toast color "3" by adjusting the position of the thermostat cam follower;

FIG. 6 is a diagrammatic view, similar to FIG. 5, with the rotatable cam in the bake position, wherein the broil switch is closed, the bake switch is open and the disc portion of the cam has moved the thermostat cam follower to select a particular threshold bake temperature "200°" which will be maintained within the oven toaster;

FIG. 7 is a diagrammatic view, similar to FIG. 5, showing the rotatable cam in the broil position, wherein the broil switch is open, the bake switch is closed, and the disc portion of the cam has moved the thermostat cam follower to a very high threshold temperature above 500°;

DESCRIPTION OF THE PREFERRED EMBODIMENT

Figure 1:
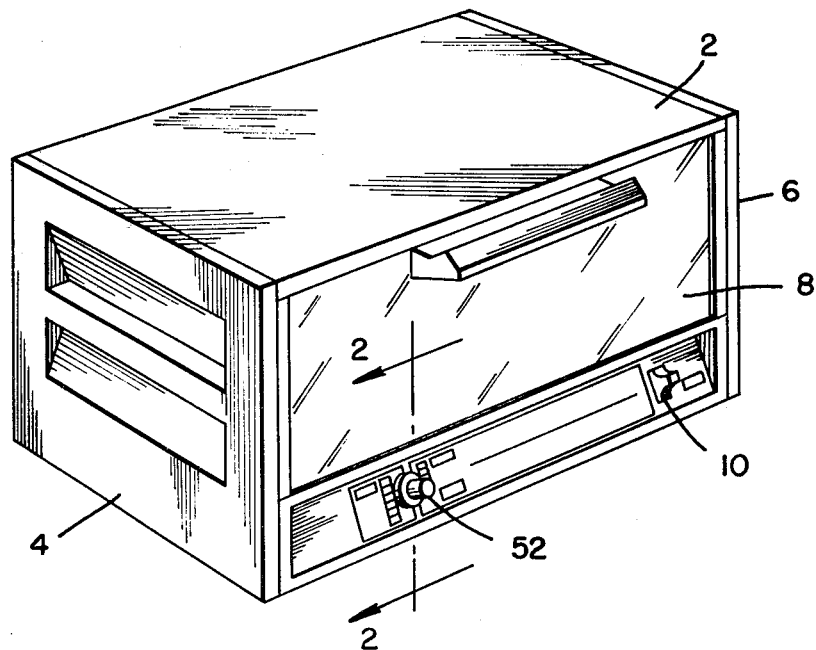
FIG. 1 is a perspective view of an electric oven toaster broiler embodying our improved control mechanism.

Referring now to the drawing and first particularly to FIG. 1, there is shown an electric oven toaster which includes a toasting, oven and broiling chamber in which is mounted a generally horizontal rack for holding food to be cooked, baked or broiled, or bread to be toasted. The oven toaster includes a generally horizontal top wall 2, generally parallel vertical side walls 4 and 6 and a front wall 8 on which the controls for the oven toaster are mounted.

Figure 11:
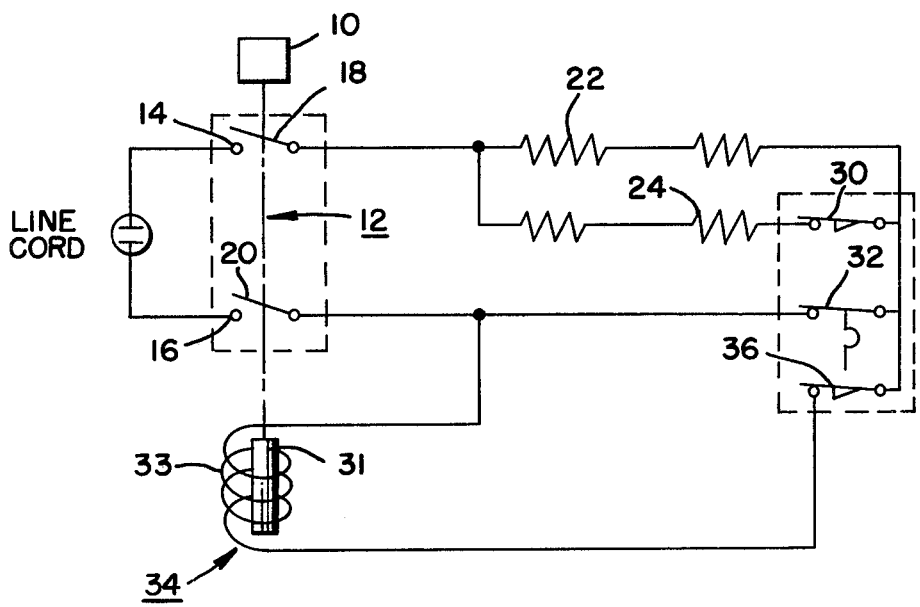
FIG. 11 is a circuit diagram and partial schematic view of portions of the control mechanism for the electric oven toaster illustrated in FIGS. 1-10.
Figure 10:
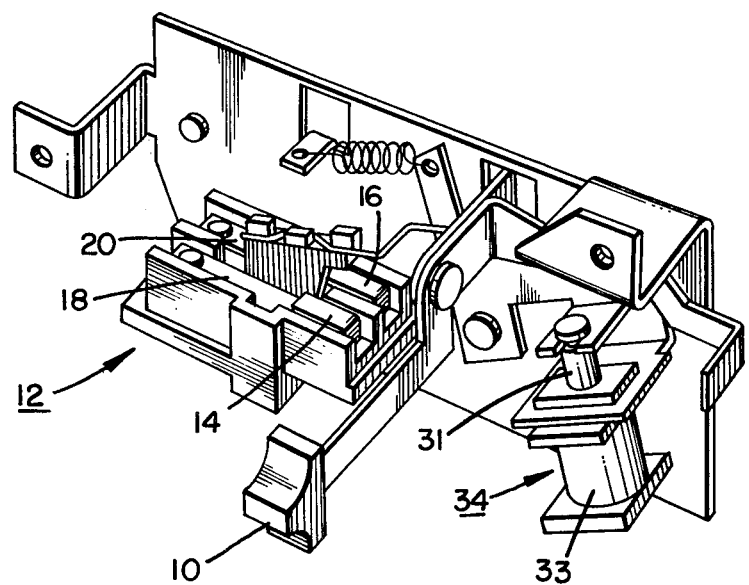
FIG. 10 is a front perspective view showing the toaster oven main switch and solenoid which may be operated by our improved control mechanism.

With particular reference to FIGS. 1, 10 and 11, a manually operable ON-OFF switch button 10 is located at the right side of the oven toaster for manually actuating the double pole main switch 12 that includes two fixed contacts 14 and 16 and two movable contacts 18 and 20 respectively. Upper heating elements 22 are connected in a parallel circuit relationship with lower heating elements 24 as shown in FIG. 11.

During a broiling operation, only the upper heating elements 22 should be energized and, accordingly, a broil switch 30 is provided for opening the circuit to the lower heating elements. A thermostat switch 32 is provided for cycling the upper and lower heating elements ON and OFF to maintain the desired baking temperature during a bake operation, for interrupting power to the upper and lower heating elements at the termination of toasting cycle when a particular toast temperature or toast color is achieved and for terminating a broiling operation when an overtemperature condition is sensed.

As shown in FIG. 11, the main switch may be manually opened or closed by simply raising or lowering switch knob 10. The main switch 12 may also be operated to its open position by energizing the solenoid 34 at the end of a toasting cycle or upon the attainment of an overtemperature condition during a broiling cycle.

A bake switch 36 is provided for opening the circuit to the solenoid to prevent the solenoid from operating during a baking operation. Thus, during a baking operation, the thermostat switch may open and close to cycle the upper and lower heating elements ON and OFF without actuating the solenoid. However, during a toasting operation with the bake switch 36 closed, the thermostat switch 32 upon reaching its threshold toast color or toast temperature will open the thermostat switch to thereby energize the solenoid 34 through the closed back switch 36 to open the main switch.

Figure 8:
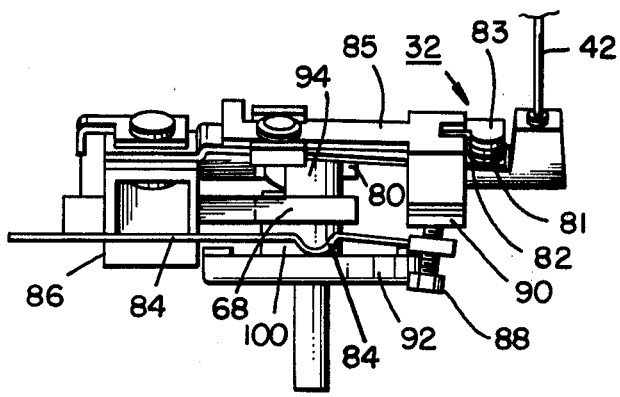
FIG. 8 is a top view of our improved control mechanism with the parts in the toast position, as illustrated in FIG. 5.

As shown more particularly in FIGS. 3 and 8, a temperature sensitive bi-metal 40 is positioned within the oven toaster in spaced relation between upper heating elements 22 and lower heating elements 24 for sensing the color of the toast to be toasted and the temperature within the cooking chamber. As the bi-metal 40 increases in temperature, it flexes generally downwardly thus causing a switch actuator rod 42 to move generally horizontally forwardly to open the thermostat switch 32.

The details of the circuit, main switch, solenoid, and bi-metal temperature sensor 40 do not form a part of this invention and are described and illustrated in greater detail in generally similar constructions shown in the aforementioned prior U.S. Pat. No. 3,752,955 to Lawrence L. Grove and a prior U.S. Pat. No. 3,119,000 to J. F. Loch et al both assigned to the same assignee as the present invention.

TOAST, BAKE, BROIL CONTROL

In accordance with our invention, a unique readily manufactured rotatable cam 50 is provided for opening or closing the switches to perform a toasting operation, a broiling operation, or a baking operation, and the cam is also constructed to simultaneously set the desired threshold temperature of the thermostat switch for the particular operation that has been selected. As shown more particularly in FIGS. 1, 2, 3, 5, 6 and 7, the cam 50 may be readily operated by means of a knob 52 that is fixed to its shaft 54.

Before describing the details of the cam, the construction and placement of the thermostat switch, the bake switch, and the broil switch will be described. As part of our invention, these switches are constructed and spaced in a particular way so that they may be readily and reliably operated by our unique rotatable cam.

The bake switch 36 functions to open the circuit to the solenoid 34 to prevent the solenoid from operating during a baking operation. Thus, the thermostat 32 may cycle ON and OFF during a baking operation to maintain the desired baking temperature. As shown in FIG. 6, the switch includes a fixed switch blade 60 having a contact 62 mounted thereon and a movable switch blade 64 having a contact 66 mounted thereon. Both of the blades extend generally horizontally to the right from their mounting block 66 and the movable blade 64 has free end portion 68 which functions as a cam follower to be operated by our unique cam 50.

The broil switch 30, which functions to open the circuit to the lower heating elements during a broiling operation, is mounted directly below the bake switch and is positioned on the opposite side of our unique rotatable cam 50. As shown more particularly in FIG. 7, the broil switch includes a fixed switch blade 70, having a contact 72 mounted thereon, and a movable switch blade 74, having a contact 76 mounted thereon. The movable switch blade extends generally horizontally to the right below the rotatable cam 50 and has a cam follower portion 80 that is readily positioned for operation by the rotatable cam.

The thermostat switch 32 is provided for cycling the heating elements ON and OFF to maintain the desired temperature during the ovening operation, terminating the toasting operation upon the achievement of a threshold temperature and also terminating a broiling operation on the sensing an overtemperature condition.

As shown more particularly in FIG. 8, the thermostat switch 32 includes a lower contact 81 which is fixed to a blade 82 that may be moved rearwardly by rod 42 upon an increase in temperature and an upper rearward bi-metal compensator contact 83 used for fast brake and make. The temperature setting of the thermostat switch 32 is adjusted or set by means of a cam follower blade 84 that extends to the right from a mounting block 86. As shown in FIG. 8, a fine adjusting screw 88 is connecting to the free end of the cam follower 84 for cooperating with a switch block 90 formed of insulating material to adjust the position of the switch contact 83. Contact 83 is fixed to a blade 85 and the insulating block 90 is connected to the blade 85.

In accordance with our invention, it can be seen that the broil switch and bake switch blades 70, 74, 60, 64 are generally parallel to each other and are positioned on opposite sides above and below the rotary cam 50. Thus, they may be moved in a radial direction toward or away from the axis of the cam 50. The thermostat switch cam follower blade 84 is also mounted generally parallel to the cam follower switch blades of the bake switch 36 and the broil switch 30 but is arranged in a plane that is generally perpendicular to the plane of operation of the bake and broil switches so that it may be moved forwardly or rearwardly by our unique cam.

Figure 9:
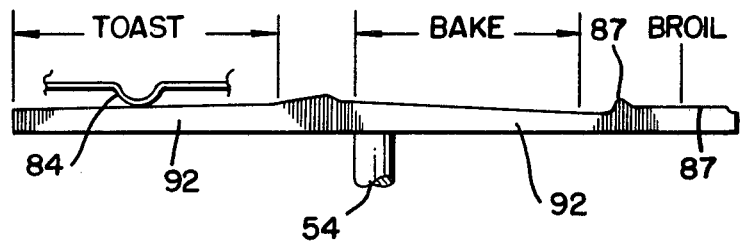
FIG. 9 is a diagrammatic view of the disc portion of the rotary cam and the thermostat cam follower showing the disc cam surfaces that are normally disposed in a circle on the disc cam, unrolled to show the relative cam levels.

As shown more particularly in FIGS. 3, 8, and 9, our unique rotatable cam is formed to include a disc portion 92 for cooperating with the thermostat switch cam follower 84 and an integrally formed rearwardly extending rod portion 94 for operating the bake and broil switches 36 and 30 respectively. As shown in FIG. 6, the bake cam lobe 100 on the rod portion 94 is spaced counterclockwise from a broil cam lobe 102. With particular reference to FIG. 8, it can be seen that the bake cam lobe 100 is axially spaced in front of the broil cam lobe 102.

With particular reference to FIG. 5, it can be seen that when the rotatable knob 52 is moved to the toast position, the cam followers 68 and 80 of both the bake and broil switches 36 and 30 are free from radial inner surfaces of the rod portion 94 of the cam to maintain both the bake and broil switches 36 and 30 in a closed position.

Figure 2:
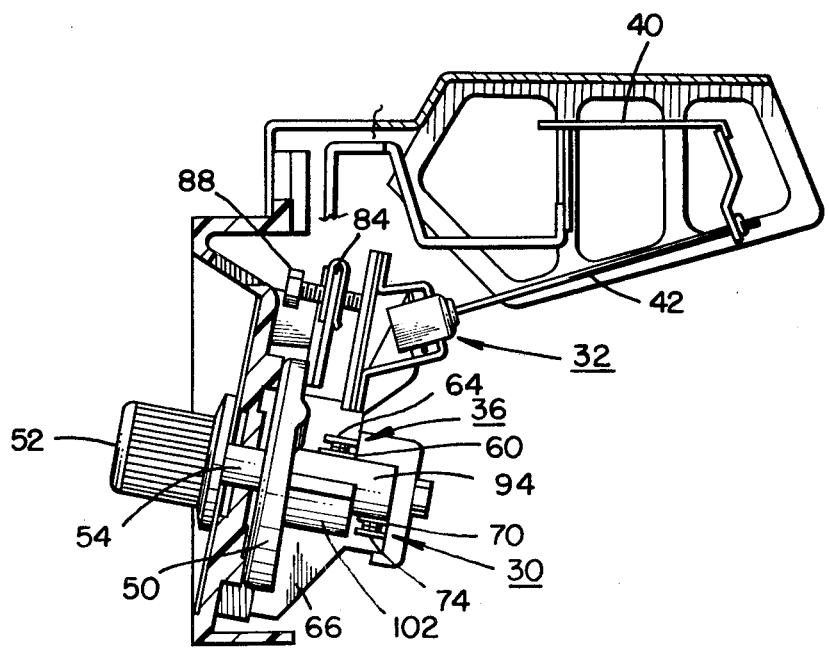
FIG. 2 is a fragmentary side elevational view of a portion of our electric toaster control mechanism.

As shown more particularly in FIG. 2 and the unrolled or expanded view of FIG. 9, the disc portion 92 of the cam has a rearwardly facing cam surface for cooperating with the thermostat cam follower 84 to set the desired threshold temperature of the thermostat switch 32.

It can be appreciated that, when the rotatable knob 52 is turned to the toast position, both the bake and broil switches will be closed as shown in FIG. 5 while the thermostat cam follower 84 as shown in FIG. 9 will reside at a particular location on the slope of the toast cam portion of the disc cam to select the desired degree of toast color from one to nine.

When the cam 50 is rotated to the bake position, the bake switch 36 will be open, as shown in FIG. 6, while the thermostat cam follower will be moved to the bake temperature surface shown in FIG. 9 to select an appropriate bake temperature between 200° and 500°.

When the cam 50 is rotated to the broil position as shown in FIG. 7, the broil switch 30 will be opened. With the broil switch open, the thermostat cam follower 84 will be on the flat 87 of the broil cam, as shown in FIG. 9, to select an overtemperature broil condition for opening the thermostat switch 32.

OPERATION

In operation slices of bread may be placed within the oven toaster and a toasting operation may be readily set by adjusting the rotary position of knob 52. With particular reference to FIG. 5, the pointer of the rotatable knob may be moved to any one of the color toast positions from one through nine or even between the numbered positions to set the color of the toast that is desired. With particular reference to FIG. 9, it can be seen that movement of the knob 52 will cause the thermostat cam follower 84 to slide on the toast portion of the rotatable disc cam 92 to set the position of the thermostat switch contact 83 and, thereby, select the threshold temperature at which the toasting operation will be completed. It can be seen that movement of the cam follower 84 rearwardly will move adjusting screw 88 rearwardly to move the second switch blade 85 of the thermostat switch on which contact 83 is mounted in a rearward direction and the further rearward it is moved, the higher the temperature or the darker the toast color adjustment. During this movement of the toast cam surface of the disc cam 92 on the thermostat cam follower 84, the rearwardly extending rod portion of the rotatable cam 50 on which the bake switch cam 100 and broil switch cam lobe 102 are integrally formed, will be moved away from both the bake switch cam follower 68 and broil switch cam follower 80 to permit these cam followers to be moved inwardly to close the bake switch 36 and the broil switch 30 as shown in FIG. 5.

The main switch contacts 14, 18, 16, and 20 are closed by depressing the ON button 10 to its ON position and both the upper and lower heating elements are energized to toast the slices of bread that have been placed in the toaster oven.

The bi-metal 40 is located adjacent to the slices of bread that are being toasted and senses the temperature in the vicinity of the toast so that, as the darkness of the toast increases, the bi-metal rod 42 will be moved forwardly as view in FIG. 3 and, when the particular color is achieved, the rod 42 will have moved the thermostat switch blade 82 and contact 81 far enough rearwardly to open the thermostat switch contacts 81 and 83. At that moment, the circuit through the solenoid coil 33 is complete and the solenoid core 31 will be moved to open the main switch contacts 14, 16, 18 and 20 thereby de-energizing both the upper and lower heating elements.

When it is desired to bake potatoes or other food within the oven toaster, the potatoes are placed in the oven toaster and the door is closed. The rotatable knob 50 is rotated so that the pointer points to the desired baking temperature from 200° to 500°.

It can be appreciated that during the movement of the rotatable control knob 50 to select a desired baking temperature, the thermostat switch cam follower 84 will be positioned at the desired position on the bake cam disc cam surface 92 illustrated in FIG. 9. Simultaneously, as shown more particularly in FIG. 6, the rod cam portion 94 of the rotatable cam will be moved so that the bake cam lobe 100 is in position to hold the bake switch cam follower 68 upwardly to open the bake switch 36 while the broil cam lobe 102 will be in the position illustrated in FIG. 6 out of the way of the broil cam follower 80 to permit the broil switch 30 to be closed. Thus, after the main switch has been closed by depressing the ON button 10, both the upper and lower heating elements will be energized. When the desired bake temperature is achieved, the bi-metal sensor 40 will move its rod 42 forwardly to open the thermostat switch 32 to de-energize the heating elements. However, as soon as the temperature lowers slightly, the bi-metal 40 will sense the lower temperature within the baking chamber to move the control rod 42 rearwardly to close the switch contacts and energize both the upper and lower heating elements. It should be appreciated that when the thermostat switch 32 is cycled ON and OFF, the solenoid 34 will not be energized since the bake switch 36 is held in its open position to prevent energization of the solenoid. Thus, during the entire baking operation, the main switch 14, 16, 18, 20 is held in its closed position.

When it is desired to broil a steak or other food, the steak is placed in the oven toaster broiler and the rotatable knob 52 is moved to the broil position. In the broil position, the thermostat cam follower 84 is moved to an extreme rearward position on the broil disc surface 85 to set a very high threshold temperature. Simultaneously, the rod portion 94 of the rotatable cam 50 will be moved to the position illustrated in FIG. 7 wherein the broil lobe 102 holds the broil cam follower switch blade 80 in the open position, while the bake cam lobe 100 is removed from the bake cam follower to permit the bake switch to be closed. Then the main switch 14, 16, 18, 20 is closed by depressing the ON button and the upper heating elements are energized to broil the steak. It should be appreciated that, during the broil operation, the broil switch 30 is held open to prevent energization of the lower heating elements. With only the upper heating elements being energized in most situations the high threshold temperature that has been set by the cooperation of the broil cam lobe 85 on the disc cam 92, the bi-metal 40 never reaches a temperature to open thermostat switch contacts 81 and 83, and the upper heating elements remain energized throughout the broil operation.

From the foregoing description, it will be appreciated that our improved, simplified mechanism for controlling an oven toaster broiler has been achieved with the use of relatively few parts. A single rotatable cam 50 with a plurality of cam surfaces on its rod portion 94 is provided for controlling a broil switch 30 and a bake switch 36, and a plurality of cam surfaces on its disc cam portion 92 are all that is necessary for controlling the termination of a toasting cycle, and the temperature during baking and broiling. The broil switch, bake switch, and thermostat switch include cam follower portions that are appropriately placed in position to be operated by our improved rotatable cam. Thus, an exceedingly simple and reliable control is achieved with the use of relatively few parts.

What we claim is:

1. In an electric oven toaster including upper heating elements, lower heating elements, a thermostat switch which may be set to open when a particular preset temperature has been reached, a main switch for energizing and deenergizing the oven toaster including both its upper and lower heating elements, a solenoid operated upon opening of the thermostat switch to open the main switch to deenergize both the upper and lower heating elements, and a bake switch which is movable to an open position during a baking operation to prevent energization of the solenoid and the opening of the main switch when the threshold temperature that has been set by the thermostat is reached to thereby permit the thermostat switch to cycle on and off during the baking operation to maintain a particular bake temperature, said bake switch being moved to a closed position during the toast operation to permit the solenoid to open the main switch when the particular temperature set by the thermostat is reached during the toasting operation, the improvement comprising:

a. a manually operable rotatable cam for opening and closing the bake switch and for setting the threshold temperature of the thermostat switch during bake and toasting operations;

b. said bake switch including a fixed contact and a movable switch blade with a contact mounted thereon, said movable switch blade including a cam follower portion;

c. said rotatable cam including a rearwardly extending rod portion having a radially outwardly extending lobe for cooperating with the cam follower portion of the bake switch for opening the bake switch when a bake operation is set and closing the bake switch when a toast operation is set by manually adjusting the position of said rotatable cam;

d. said thermostat switch including a temperature sensor, a first movable switch blade with a contact mounted theron, said first movable switch blade being positioned for movement by said temperature sensor, a second movable switch blade with a contact mounted thereon, said second movable switch blade including a thermostat cam follower portion which may be adjusted to set the threshold temperature at which said sensor may open said thermostat switch; and e. said rotatable cam including a circular disc portion integrally formed with said rod portion, said circular disc portion having a cam surface in sliding engagement with the thermostat cam follower portion of said second movable switch blade so that the rotary position of said rotatable cam may be manually adjusted to set the disc portion of said cam to set the thermostat cam follower for a particular toast color and simultaneously set the rod portion of said cam to close the bake switch so that the solenoid will be energized to open the main switch when the thermostat switch is opened at the toast temperature that has been set.

2. In an electric oven toaster including upper heating elements, lower heating elements, a thermostat switch which may be set to open when a particular preset temperature has been reached, a main switch for energizing and deenergizing the oven toaster including both its upper and lower heating elements, a solenoid operated upon opening of the thermostat switch to open the main switch to deenergize both the upper and lower heating elements, and a bake switch which is movable to an open position during a baking operation to prevent energization of the solenoid and the opening of the main switch when the threshold temperature that has been set by the thermostat is reached to thereby permit the thermostat switch to cycle on and off during the baking operation to maintain a particular bake temperature, said bake switch being moved to a closed position during the toast operation to permit the solenoid to open the main switch when the particular temperature set by the thermostat is reached during the toasting operation, the improvement comprising:
 a. a manually operable rotatable cam for opening and closing the bake switch and for setting the threshold temperature of the thermostat switch during the bake operation;
 b. said bake switch including a switch blade with a contact mounted thereon and a movable switch blade with a contact mounted thereon, said movable switch blade including a cam follower portion;
 c. said rotatable cam including a rearwardly extending rod portion having a radially outwardly extending lobe for cooperating with the cam follower portion of the bake switch for opening the bake switch when a bake operation is set by manually adjusting the position of said rotatable cam;
 d. said thermostat switch including a temperature sensor, a first movable switch blade with a contact mounted theron, said first movable switch blade being positioned for movement by said temperature sensor, a second movable switch blade with a contact mounted theron, said second movable switch blade including a thermostat cam follower portion which may be adjusted to set the threshold temperature at which said sensor may open said thermostat switch; and said rotatable cam including a circular disc portion positioned in front of said rod portion and integrally formed therewith, said circular disc portion having a cam surface that extends rearwardly and is in sliding engagement with thermostat cam follower portion so that the rotary position of said rotatable cam may be manually adjusted to simultaneously open the bake switch and set the bake temperature of said thermostat switch.

3. In an electric oven toaster broiler including upper heating elements, lower heating elements, a broil switch which is movable to an open position for deenergizing the lower heating elements during a broil operation, a thermostat switch which may be set to open when a particular preset temperature has been reached, a main switch for energizing and deenergizing the oven toaster broiler including both its upper and lower heating elements, a solenoid operated upon opening of the thermostat switch to open the main switch to deenergize both the upper and lower heating elements, and a bake switch which is movable to an open position during a baking operation to prevent energization of the solenoid and the opening of the main switch when the threshold temperature is reached to thereby permit the thermostat switch to cycle on and off during the baking operation to maintain a particular bake temperature, said bake switch being moved to a closed position during both the toast and broil operations to permit the solenoid to open the main switch when the particular temperature set by the thermostat is reached during the toasting operation and to also permit the solenoid to open the main switch when a very high temperature may be reached during a broil operation to open the main switch, the improvement comprising:
 a. a manually operable rotatable cam for opening and closing the bake and broil switches and for setting the threshold temperature of the thermostat switch during bake, broil and toasting operations;
 b. said bake switch including a switch blade with a contact mounted thereon and a movable switch blade with a contact mounted thereon, said movable switch blade including a cam follower portion;
 c. said broil switch including a switch blade with a contact mounted thereon and a movable switch blade with a contact mounted thereon, said movable broil switch blade including a cam follower portion;
 d. said rotatable cam including a rearwardly extending rod portion having a first radially outwardly extending lobe for cooperating with the cam follower portion of the bake switch for opening the bake switch when a bake operation is set and a second radially outwardly extending lob spaced rearwardly and clockwise from said first radially outwardly extending lobe for cooperating with the cam follower portion of the broil switch for opening the broil switch when a broil operation is set by manually adjusting the position of said rotatable cam;
 e. said thermostat switch including a temperature sensor, a first movable switch blade with a contact mounted thereon, said first movable switch blade being positioned for movement by said temperature sensor, a second movable switch blade with a contact mounted thereon, said second movable switch blade being in engagement with the thermostat cam follower so that it may be adjusted to set the threshold temperature at which said sensor may open said thermostat switch; and
 f. said rotatable cam including a circular disc portion positioned in front of said rod portion and integrally formed therewith, said circular disc portion having a cam surface that extends rearwardly and is in sliding engagement with thermostat cam follower portion so that the rotary position of said rotatable cam may be manually adjusted to simultaneously open the broil switch, close the bake switch and set a very high threshold temperature for said thermostat switch during broil operation.

4. In an electric oven toaster broiler including upper heating elements, lower heating elements, a broil switch which is movable to an open position for deenergizing the lower heating elements during a broil operation, a thermostat switch which may be set to open when a particular present temperature has been reached, a main switch for energizing and deenergizing the oven toaster broiler including both its upper and lower heating elements, a solenoid operated upon opening of the thermostat switch to open the main switch to deenergize both the upper and lower heating elements, and a bake switch which is movable to an open position during a baking operation to prevent energization of the solenoid and the opening of the main switch when the threshold temperature that has been set by the thermostat is reached to thereby permit the thermostat switch to cycle on and off during the baking operation to maintain a particular bake temperature, said bake switch being moved to a closed position during both the toast and broil operations to permit the solenoid to open the main switch when the particular temperature set by the thermostat is reached during the toasting operation and to also permit the solenoid to open the main switch when a very high temperature may be reached during a broil operation to open the main switch, the improvement comprising:

a. a manually operable rotatable cam for opening and closing the bake and broil switches and for setting the threshold temperature of the thermostat switch during bake, broil and toasting operations;

b. said bake switch including a switch blade with a contact mounted theron and a movable switch blade with a contact mounted thereon, said movable switch blade including a cam follower portion;

c. said broil switch including a switch blade with a contact mounted thereon and a movable switch blade with a contact mounted thereon, said movable broil switch blade including a cam follower portion;

d. said rotatable cam including a rearwardly extending rod portion having a first radially outwardly extending lobe for cooperating with the cam follower portion of the bake switch for opening the bake switch when a bake operation is set and a second radially outwardly extending lobe spaced rearwardly and clockwise from said first radially outwardly extending lobe for cooperating with the cam follower portion of the broil switch for opening the broil switch when a broil operation is set, the rod portion of said cam having a generally radially inwardly disposed smooth circumferential surface disposed between said lobes for cooperating with the bake switch cam follower for closing the bake switch during the toast and broil operations and for cooperating with the broil switch cam follower to close the broil switch during toast and bake operations by manually adjusting the position of said rotatable cam;

e. said thermostat switch including a temperature sensor, a first movable switch blade with a contact mounted thereon, said first movable switch blade being positioned for movement by said temperature sensor, a second movable switch blade with a contact mounted thereon, said second movable switch blade being in engagement with the thermostat cam follower so that it may be adjusted to set the threshold temperature at which said sensor may open said thermostat switch; and f. said rotatable cam including a circular disc portion positioned in front of said rod portion and integrally formed therewith, said circular disc portion having cam surfaces that extend rearwardly and are in sliding engagement with thermostat cam follower portion so that the rotary position of said rotatable cam may be manually adjusted to a broil position to simultaneously open the broil switch, close the bake switch and set a very high threshold temperature for said thermostat switch during the broil operation, the toasting cam surface extending through approximately 130° of said circular disc for setting toasting positions 1 through 9, the bake cam surface extending through approximately 110° of said disc cam for setting bake temperatures between 200° and 500° and the broil cam extending through approximately 10° of said disc cam surface for holding the cam follower of the thermostat switch at a very high set temperature.

5. An electric oven toaster broiler as defined in claim 4 wherein the bake switch blades extend in the same direction as and are generally parallel to the broil switch blades, the cam follower portion of said bake switch engaging the rod portion of said rotatable cam at a position approximately 180° from the surface engagement of the cam follower portion of the broil switch with the rod cam surface.

* * * * *